(12) United States Patent
Diehl et al.

(10) Patent No.: US 11,906,631 B2
(45) Date of Patent: Feb. 20, 2024

(54) VARIABLE RESOLUTION SENSORS

(71) Applicant: Pony AI Inc., Grand Cayman (KY)

(72) Inventors: Peter G. Diehl, Shanghai (CN); Robert Dingli, Cupertino, CA (US); Cyrus Abari, San Bruno, CA (US); Yui-Hong Matthias Tan, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 194 days.

(21) Appl. No.: 17/498,355

(22) Filed: Oct. 11, 2021

(65) Prior Publication Data

US 2022/0027641 A1 Jan. 27, 2022

Related U.S. Application Data

(63) Continuation of application No. 16/588,431, filed on Sep. 30, 2019, now Pat. No. 11,144,769.

(51) Int. Cl.
| | | |
|---|---|---|
| *G06V 20/56* | (2022.01) | |
| *G06V 10/147* | (2022.01) | |
| *G06V 10/22* | (2022.01) | |
| *G01S 17/931* | (2020.01) | |
| *G01S 17/89* | (2020.01) | |
| *G01S 17/86* | (2020.01) | |

(52) U.S. Cl.
CPC ............ *G01S 17/931* (2020.01); *G01S 17/86* (2020.01); *G01S 17/89* (2013.01); *G06V 10/147* (2022.01); *G06V 10/22* (2022.01); *G06V 20/56* (2022.01)

(58) Field of Classification Search
None
See application file for complete search history.

(56) References Cited

U.S. PATENT DOCUMENTS

| | | | | |
|---|---|---|---|---|
| 2017/0031363 A1* | 2/2017 | Laur | ...................... | G05D 1/024 |
| 2019/0242978 A1* | 8/2019 | Weed | .................... | G01S 7/4817 |
| 2019/0271769 A1* | 9/2019 | Raly | .................. | G02B 26/0858 |
| 2020/0284883 A1* | 9/2020 | Ferreira | .................. | G01S 17/10 |

\* cited by examiner

*Primary Examiner* — Idowu O Osifade

(57) ABSTRACT

Provided herein is a system and method that acquires data and determines a driving action based on the data. The system comprises a processor configured to acquire data of nonuniform resolution over a field of view of the sensor, and a controller configured to determine a driving action of a vehicle based on the data, and perform the driving action.

20 Claims, 15 Drawing Sheets

300

1200

Acquire data of nonuniform resolution, by a sensor, over a field of view of the sensor 1202

Determine, by a controller, a driving action of a vehicle based on the data 1204

Perform, by the controller, the driving action 1206

FIG. 12

VARIABLE RESOLUTION SENSORS

CROSS REFERENCE TO RELATED APPLICATIONS

This application is a continuation under 35 U.S.C. § 121 of U.S. patent application Ser. No. 16/588,431, filed Sep. 30, 2019, the content of which is incorporated by reference in its entirety into the present disclosure.

TECHNICAL FIELD

The present disclosure relates generally to sensors that can capture data of a nonuniform resolution, for example, data of higher resolutions in certain regions of a field of view of the sensors.

BACKGROUND

Vehicles such as autonomous vehicles (AVs) may have sensors such as LiDAR, camera, and radar sensors to capture sensor data such as images and maps. Currently, sensors capture data of uniform resolution. All pixels of a sensor have a same size and distance between one another. Numerous sensors may be required to acquire data, images, or maps in distinct regions of interest or distinct features having higher or enhanced resolutions. For example, a camera may be required to acquire a high-resolution view of a nearby traffic sign. Another camera may be required to acquire a high-resolution view of a distant landmark. Another camera or LiDAR sensor may be required to acquire a high-resolution view or map of traffic data. Having numerous sensors on a vehicle increases cost and takes up space on or inside the vehicle. These shortfalls are addressed by the present disclosures, which provides an efficient system and method for limiting a required amount of sensors while acquiring high-resolution data in certain regions of a field of view.

SUMMARY

Described herein are systems and methods for acquiring data in one or more regions of interest. The one or more regions of interest have higher resolution compared to other regions. For example, in a vehicle, the one or more regions of interest may correspond to, or may be likely to correspond to, a sensor's field of view that includes traffic signs or landmarks, and/or moving traffic, which may be important for a vehicle to determine actions while driving. For example, clearly detecting a stop sign may be important for a vehicle to properly stop. In addition, knowing locations, speeds, and accelerations of other vehicles may be important for a vehicle in determining whether and/or when to make a lane change or turn.

Various embodiments of the present disclosure provide a system comprising a sensor comprising a processor configured to acquire data of nonuniform resolution over a field of view of the sensor, and a controller configured to determine a driving action of a vehicle based on the data and perform the driving action.

In some embodiments, the processor comprises a chip having an uneven distribution of pixels with higher concentrations of pixels corresponding to one or more regions of interest.

In some embodiments, the uneven distribution of pixels comprises an outer region of pixels having a higher concentration of pixels compared to other regions of the pixels.

In some embodiments, the uneven distribution of pixels comprises an outer region of pixels and an inner region of pixels having a higher concentration of pixels compared to other regions of the pixels.

In some embodiments, the uneven distribution of pixels comprises a first region of pixels having a higher concentration of pixels compared to a second region of pixels.

In some embodiments, the first region of pixels is disposed closer to a center of the field of view compared to the second region of pixels.

In some embodiments, the uneven distribution of pixels comprises a third region of pixels having a higher concentration of pixels compared to the second region of pixels, wherein a portion of the second region of pixels is disposed between the first region of pixels and the third region of pixels.

a third region of pixels having a higher concentration of pixels compared to the second region of pixels, wherein a portion of the second region of pixels is disposed between the first region of pixels and the third region of pixels In some embodiments, one or both of the first region of pixels and the second region of pixels comprises a rectangular section.

In some embodiments, the processor is configured to dynamically adjust a resolution in one or more different regions of the field of view of the sensor based on a presence of one or more objects or respective rates of changes of the one or more objects at locations corresponding to the different regions of the field of view.

In some embodiments, each of the pixels comprises: a detector configured to detect light or electromagnetic radiation and convert the detected light or electromagnetic radiation into an electric signal; a buffer configured to isolate the electric signal from at least one other electric signal; and a logic element configured to process the electric signal into the data.

In some embodiments, the controller is configured to determine the driving action by adjusting a speed of the vehicle to avoid waiting at traffic lights based on data from a nearest traffic light and data from another traffic light.

Various embodiments of the present disclosure provide a method. The method comprises acquiring data of nonuniform resolution, by a processor of a sensor, over a field of view of the sensor; determining a driving action of a vehicle based on the data; and performing the driving action.

In some embodiments, the acquiring the data of nonuniform resolution comprises acquiring, by a chip of the processor having an uneven distribution of pixels, data in one or more regions of interest corresponding to higher concentrations of pixels.

In some embodiments, the region of interest corresponds to an outer region of pixels having a higher concentration of pixels compared to other regions of the pixels.

In some embodiments, the region of interest corresponds to an outer region of pixels and an inner region of pixels having a higher concentration of pixels compared to other regions of the pixels.

In some embodiments, the region of interest corresponds to a first region of pixels compared to a second region of pixels.

In some embodiments, the first region of pixels is disposed closer to a center of the field of view compared to the second region of pixels.

In some embodiments, a portion of the second region of pixels is disposed between the first region of pixels and a third region of pixels having a higher concentration of pixels compared to the second region of pixels.

In some embodiments, one or both of the first region of pixels and the second region of pixels comprises a rectangular section.

In some embodiments, the method further comprises dynamically adjusting a resolution in one or more different regions of the field of view of the sensor based on a presence of one or more objects or respective rates of changes of the one or more objects at locations corresponding to the different regions of the field of view.

In some embodiments, the acquiring, by a chip of the processor having an uneven distribution of pixels, data, comprises: detecting, by a detector, light or electromagnetic radiation; converting, by the detector, the detected light or electromagnetic radiation into an electric signal; isolating, by a buffer, the electric signal from at least one other electric signal; and converting, by a logic, the electric signal to the data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 12 illustrates an flowchart of an example of a method according to some embodiments of the present disclosure.

DETAILED DESCRIPTION

In order for sensors such as camera, LiDAR, and radar sensors to effectively capture data while emphasizing or highlighting certain features of data with enhanced resolution, the sensors may require pixels configured to capture data having regions of increased resolution. The sensors may use a chip having a variable distribution and/or concentration of pixels. By using a variable distribution and/or concentration of pixels, data may be processed faster and have less storage requirements compared to a case in which the distribution and/or concentration of pixels is uniform.

Figure 1:
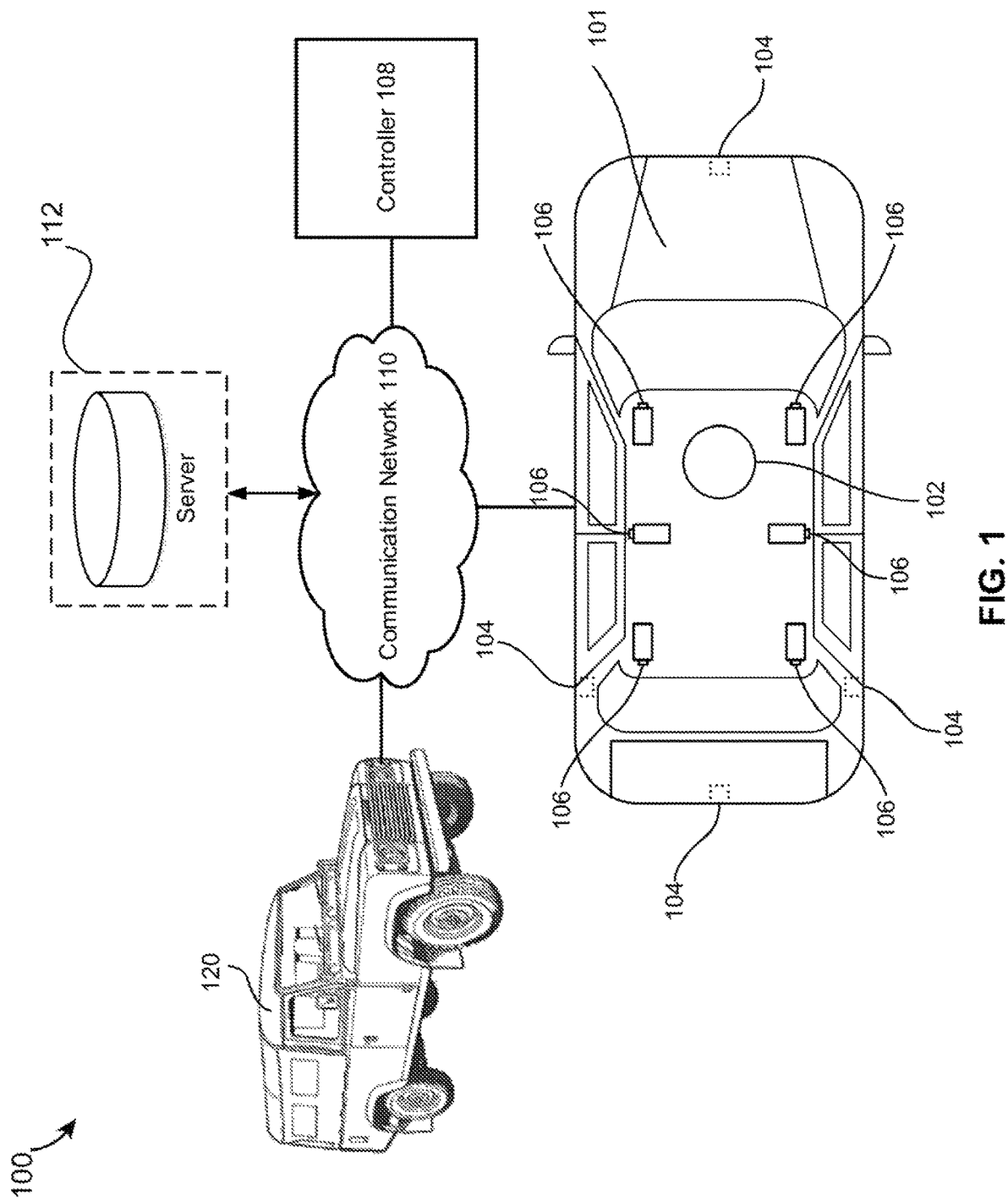
FIG. 1 illustrates an example environment of a system that acquires data of nonuniform resolution over a field of view of a sensor, determines a driving action of a vehicle, and performs the driving action, according to an embodiment of the present disclosure.

FIG. 1 illustrates an example environment 100 of a system that acquires data of nonuniform resolution over a field of view of a sensor, determines a driving action of a vehicle, and performs the driving action, according to an embodiment of the present disclosure. In FIG. 1, a vehicle such as an autonomous vehicle 101 may include myriad sensors (LiDAR systems 102, radar systems 104, cameras 106, GPS, sonar, ultrasonic, IMU (inertial measurement unit), accelerometers, gyroscopes, magnetometers, and FIR (far infrared) sensors) to detect and identify objects in the surrounding. For example, the LiDAR systems 102 can generate a three-dimensional map of the environment. The LiDAR systems 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. For example, the vehicle 101 can adjust vehicle speed based on speed limit signs posted on roadways. In some embodiments, based on image data captured by the cameras 106, the vehicle 101 can determine and adjust speed at which the vehicle 101 is traveling in relation to other objects in the surroundings. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

Data from the LiDAR systems 102, radar systems 104 and cameras 106 may have regions of interest having enhanced resolution compared to other regions of the data. For example, camera data may comprise an image having regions of higher resolution compared to remaining regions of the image. The regions of interest may correspond to, or coincide with, other vehicles on a road, traffic signs, and/or traffic lights. The data from the LiDAR systems 102, radar systems 104 and cameras 106 may be used in driving and/or navigation actions of the vehicle 101 by a controller 108 of the vehicle 101. The controller 108 may coordinate driving actions such as changing lanes, stopping, turning, and/or controlling a speed and/or acceleration of the vehicle 101. In some examples, after the LiDAR systems 102, radar systems 104 and cameras 106 acquire data of not only a nearest traffic light but also traffic lights over a distance (e.g., when the traffic lights turn green and an expected time the traffic lights will turn red or yellow), the controller 108 may control a speed and/or other driving action of the vehicle 101 to reduce or eliminate a time for waiting at traffic lights. For example, the controller 108 may take the data regarding what time each traffic light turned green and an expected time span in which each traffic light may remain green to estimate when each traffic light may turn yellow or red, to determine a required speed for the vehicle 101 to pass each traffic light (not only the nearest traffic light, but also planning ahead for farther traffic lights) when each traffic light is green. In some examples, after the LiDAR systems 102, radar systems 104 and cameras 106 acquire data of traffic, the controller 108 may control a speed and/or other driving action of the vehicle 101 to reduce or minimize a time for waiting in traffic. The controller 108 may further communicate planned driving actions of the vehicle 101 to other vehicles such as the another vehicle 120 so the other vehicles such as the another vehicle 120 may control their speed and/or other driving actions to reduce, minimize, or eliminate waiting in traffic and/or at traffic lights. For example, if the vehicle 101 plans to change to a left lane, the planned action may be communicated to other vehicles such as the another vehicle 120. The another vehicle 120 may plan to change to a right lane to avoid interference with the vehicle 101. Other vehicles may plan accordingly to ensure an even distribution of vehicles on each lane. The data from the LiDAR systems 102, radar systems 104 and cameras 106 may be sent over a communication network 110 to a server 112 that may store the data for use by other vehicles such as another vehicle 120. The vehicle 101 may also acquire data from the another vehicle 120, either directly in an ad-hoc network, or through the server 112.

Figure 2:
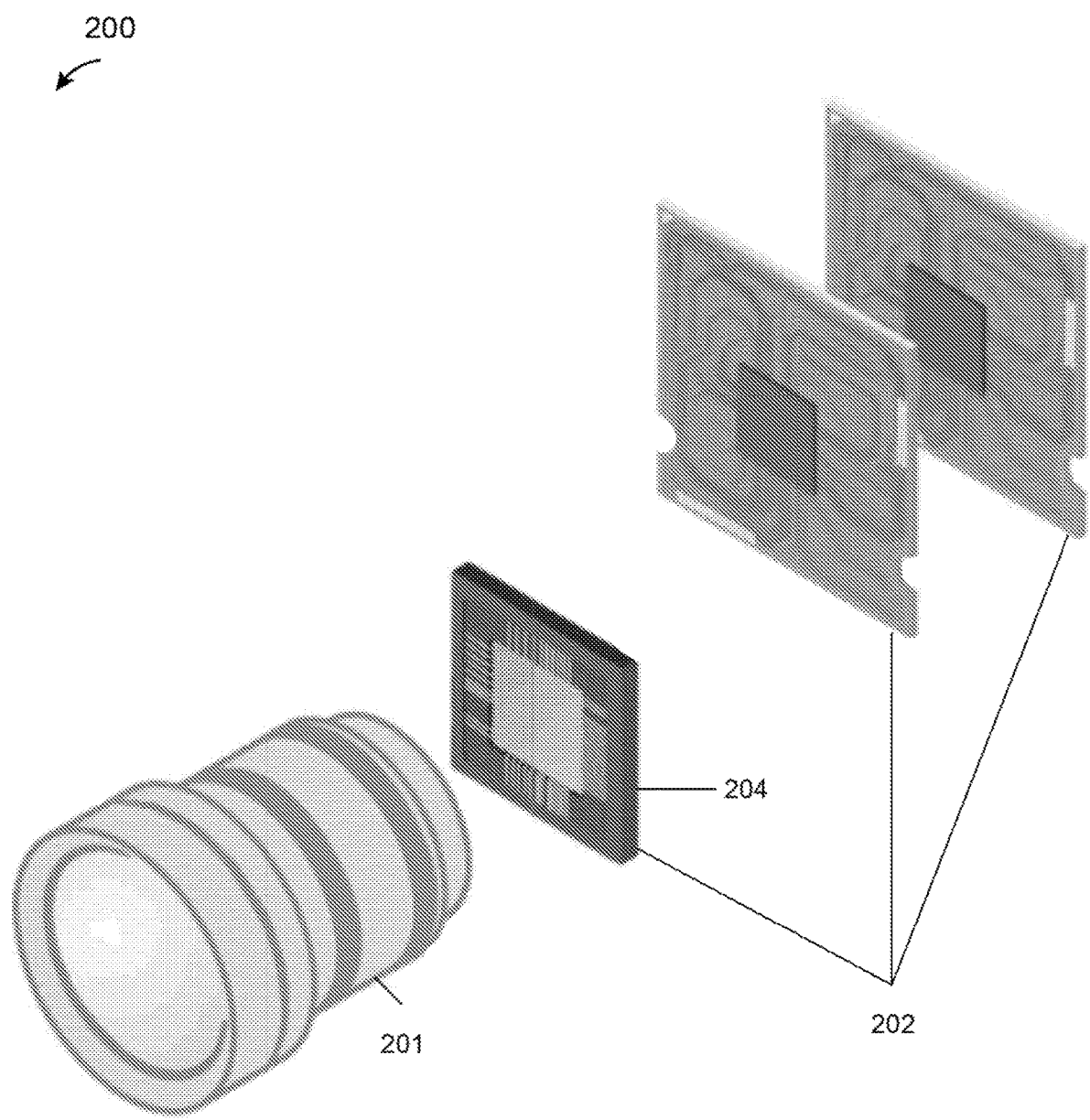
FIG. 2 illustrates an example diagram of a sensor, according to an embodiment of the present disclosure.

FIG. 2 illustrates an example diagram of a sensor 200, according to an embodiment of the present disclosure. In some embodiments, the sensor 200 may comprise a camera, LiDAR, or radar sensor, which may be implemented as LiDAR system 102, radar system 104 or camera 106. In some embodiments, the sensor 200 may comprise a lens 201, a processor 202, wherein the processor 202 further comprises a chip 204 having pixels. Light or electromagnetic radiation entering through the lens 201 may be processed into an image with the processor 202. Details of the pixels of the chip 204 will be described in further detail in FIGS. 3-11.

Figure 3:
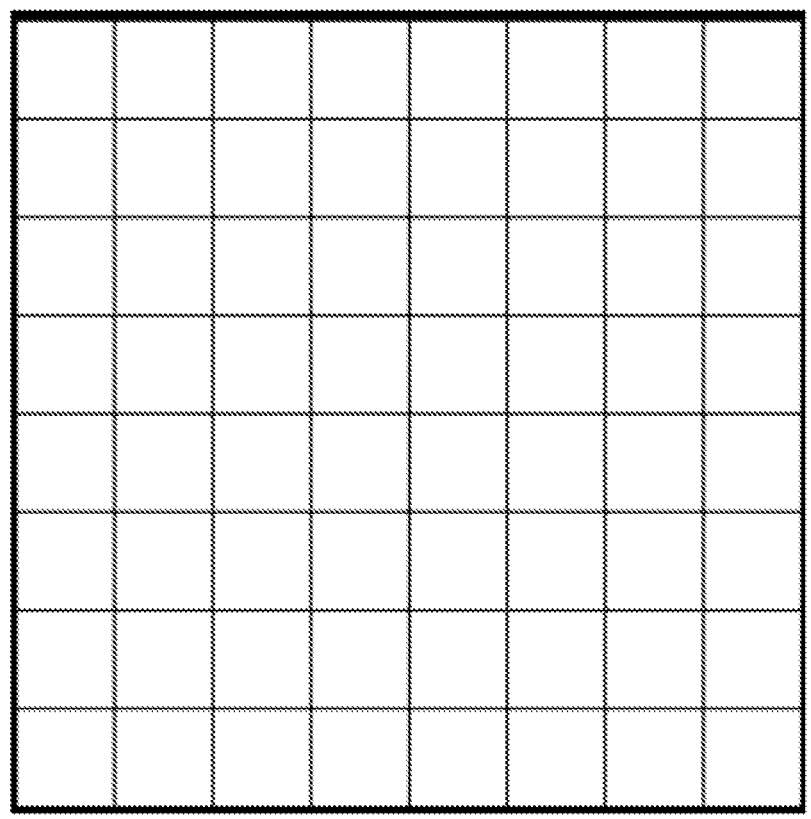
FIG. 3 illustrates an example of a pixel arrangement used conventionally in a sensor.

FIG. 3 illustrates an example of a pixel arrangement 300 used conventionally in a sensor. The pixel arrangement 300 may have an even distribution of pixels. Each pixel may be equal in size and equally spaced apart from an adjacent pixel. An image captured by a sensor having the pixel arrangement 300 may have a uniform resolution over a field of view of the image.

Figure 4:
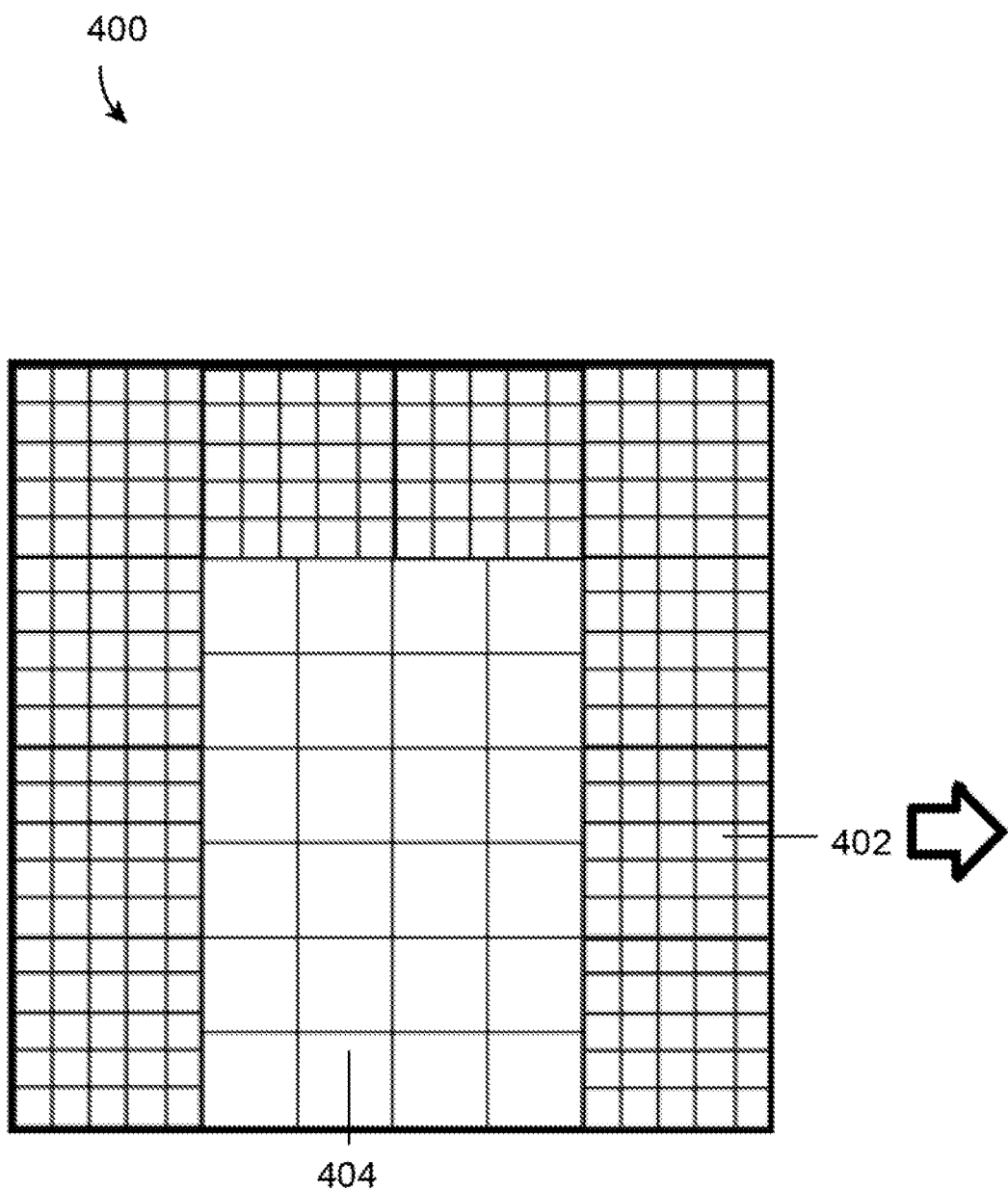
FIG. 4 illustrates a pixel arrangement according to an embodiment of the present disclosure and an operation of a sensor using the pixel arrangement.
Figure 4:
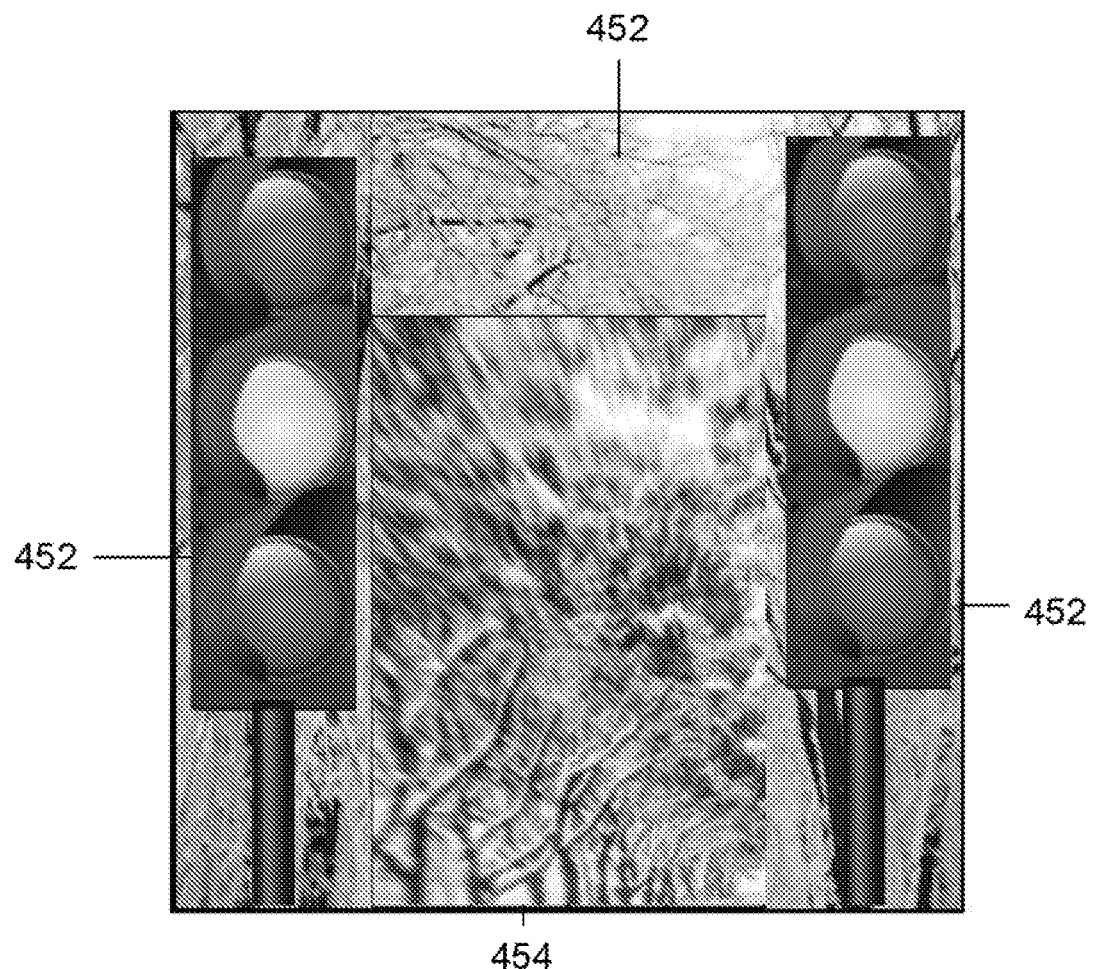

FIG. 4 illustrates a pixel arrangement 400 according to an embodiment of the present disclosure and an operation of a sensor using the pixel arrangement. The pixel arrangement 400 may be implemented with the environment 100 in some embodiments. In some embodiments, the pixel arrangement 400 may comprise a first region of pixels 402 and a second region of pixels 404. In some embodiments, the first region of pixels 402 have smaller pixels that are positioned more closely together compared to pixels of the second region of pixels 404. In some embodiments, a distance between adjacent pixels in the first region of pixels 402 is smaller than a distance between adjacent pixels in the second region of pixels 404. In some embodiments, the first region of pixels 402 may comprise one or more rectangular regions, or a rectangular arch. In some embodiments, the second region of pixels 404 may comprise one or more rectangular regions. In some embodiments, the first region of pixels 402 may be disposed outside of the second region of pixels 404. In some embodiments, pixels in the first region of pixels 402 may be equal in size and equally spaced apart. In some embodiments, pixels in the second region of pixels 404 may be equal in size and equally spaced apart. In some embodiments, the first region of pixels 402 may correspond to one or more regions of interest having higher resolution than other regions. When a sensor uses the pixel arrangement 400, the sensor may generate an image or other data having a region of interest 452 of higher resolution than a region 454. The region of interest 452 may correspond to or coincide with the first region of pixels 402, and the region 454 may correspond to or coincide with the second region of pixels 404. The region of interest 452 may include traffic lights, other traffic signs, and/or other traffic that may be required to properly determine driving actions.

Figure 5:
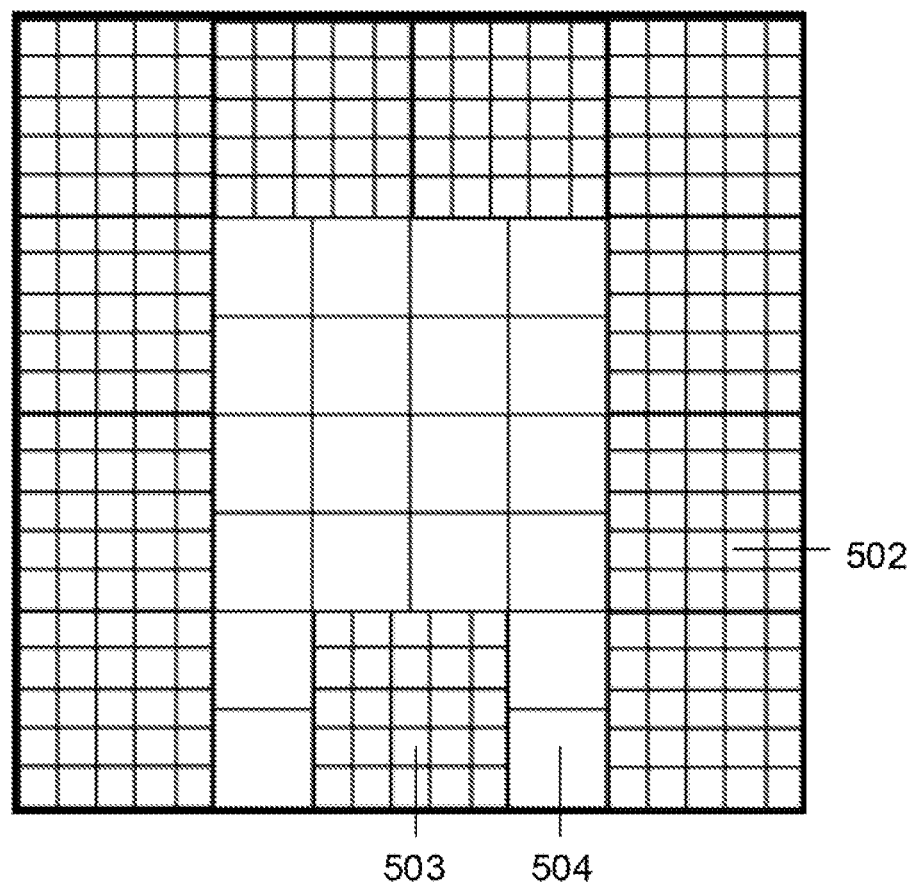
FIGS. 5-9 illustrate pixel arrangements according to embodiments of the present disclosure.

FIG. 5 illustrates a pixel arrangement 500 according to an embodiment of the present disclosure. The pixel arrangement 500 may be implemented with the environment 100 in some embodiments. In some embodiments, the pixel arrangement 500 may comprise a first region of pixels 502, a second region of pixels 503, and a third region of pixels 504. In some embodiments, the first region of pixels 502 and the second region of pixels 503 may have smaller pixels that are positioned more closely together compared to pixels of the third region of pixels 504. In some embodiments, a distance between adjacent pixels in the first region of pixels 502 and between adjacent pixels in the second region of pixels 503 may be smaller than a distance between adjacent pixels in the third region of pixels 504. In some embodiments, a size of each pixel and a distance between adjacent pixels may be equal in the first region of pixels 502 and the second region of pixels 503. Alternatively, a size of each pixel and a distance between adjacent pixels may be unequal in the first region of pixels 502 and the second region of pixels 503. For example, pixels in the first region of pixels 502 may be smaller and closer together than pixels in the second region of pixels 503. In some embodiments, pixels in the first region of pixels 502 may be equal in size and equally spaced apart. In some embodiments, pixels in the second region of pixels 503 may be equal in size and equally spaced apart. In some embodiments, pixels in the third region of pixels 504 may be equal in size and equally spaced apart. In some embodiments, the first region of pixels 502 may comprise one or more rectangular regions, or a rectangular arch. In some embodiments, the second region of pixels 503 may comprise one or more rectangular regions. In some embodiments, the third region of pixels 504 may comprise one or more rectangular regions. In some embodiments, the first region of pixels 502 may be disposed outside of the second region of pixels 503 and the third region of pixels 504. In some embodiments, the third region of pixels 504 may be at least partially disposed in between the first region of pixels 502 and the second region of pixels 503. In some embodiments, the first region of pixels 502 and the third region of pixels 503 may correspond to one or more regions of interest having higher resolution than other regions.

Figure 6:
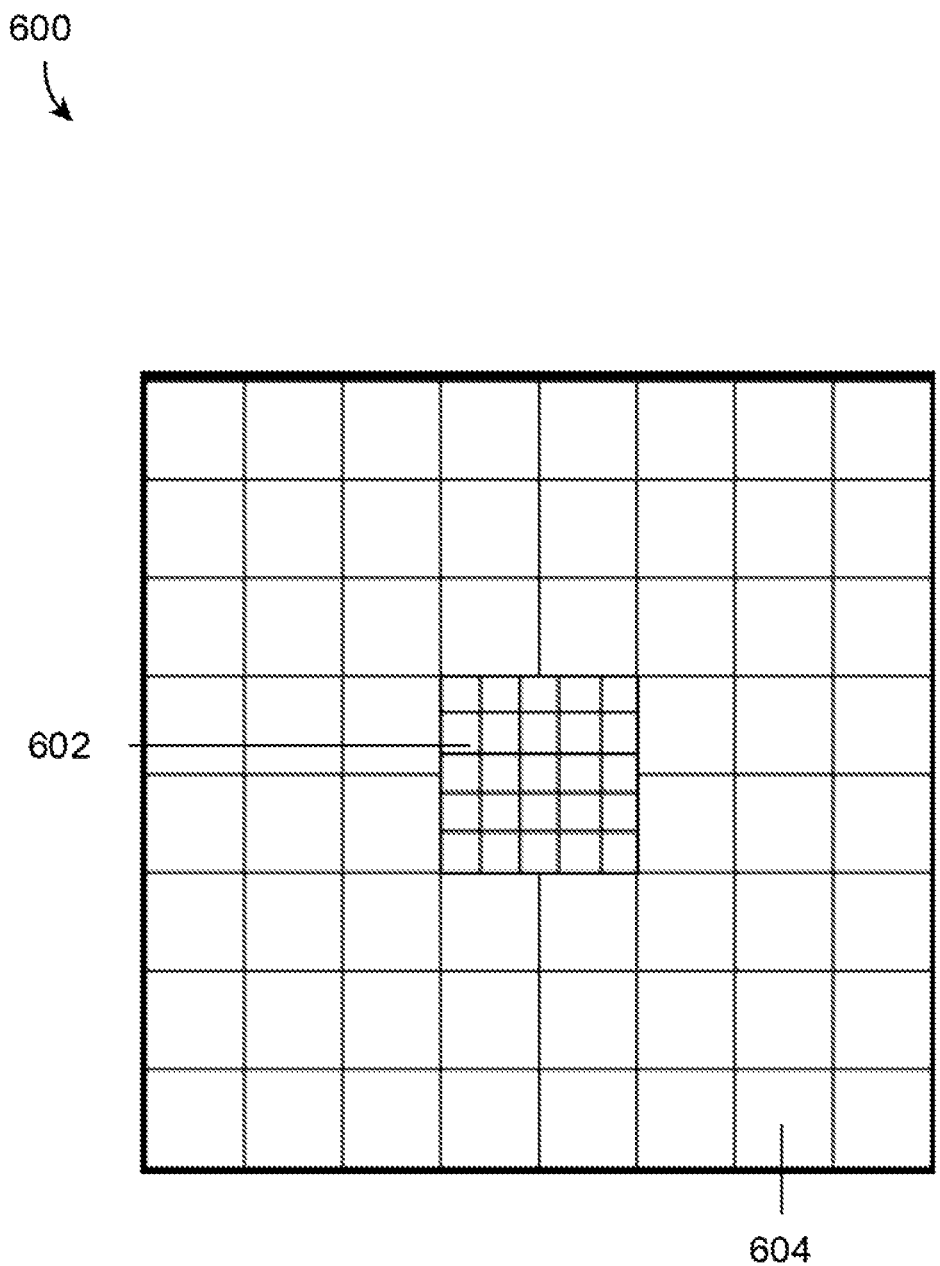

FIG. 6 illustrates a pixel arrangement 600 according to an embodiment of the present disclosure. The pixel arrangement 600 may be implemented with the environment 100 in some embodiments. In some embodiments, the pixel arrangement 600 may comprise a first region of pixels 602, and a second region of pixels 604. In some embodiments, the first region of pixels 602 may have smaller pixels that are positioned more closely together compared to pixels of the second region of pixels 604. In some embodiments, a distance between adjacent pixels in the first region of pixels 602 may be smaller than a distance between adjacent pixels in the second region of pixels 604. In some embodiments, pixels in the first region of pixels 602 may be equal in size and equally spaced apart. In some embodiments, pixels in the second region of pixels 604 may be equal in size and equally spaced apart. In some embodiments, the first region of pixels 602 may comprise one or more rectangular regions, or a rectangular arch. In some embodiments, the second region of pixels 604 may comprise one or more rectangular regions. In some embodiments, the first region of pixels 602 may be disposed in an interior of the second region of pixels 604. In some embodiments, a size or area of the first region of pixels 602 may be smaller than a size of the second region of pixels 604. In some embodiments, the first region of pixels 602 may correspond to one or more regions of interest having higher resolution than other regions.

Figure 7:
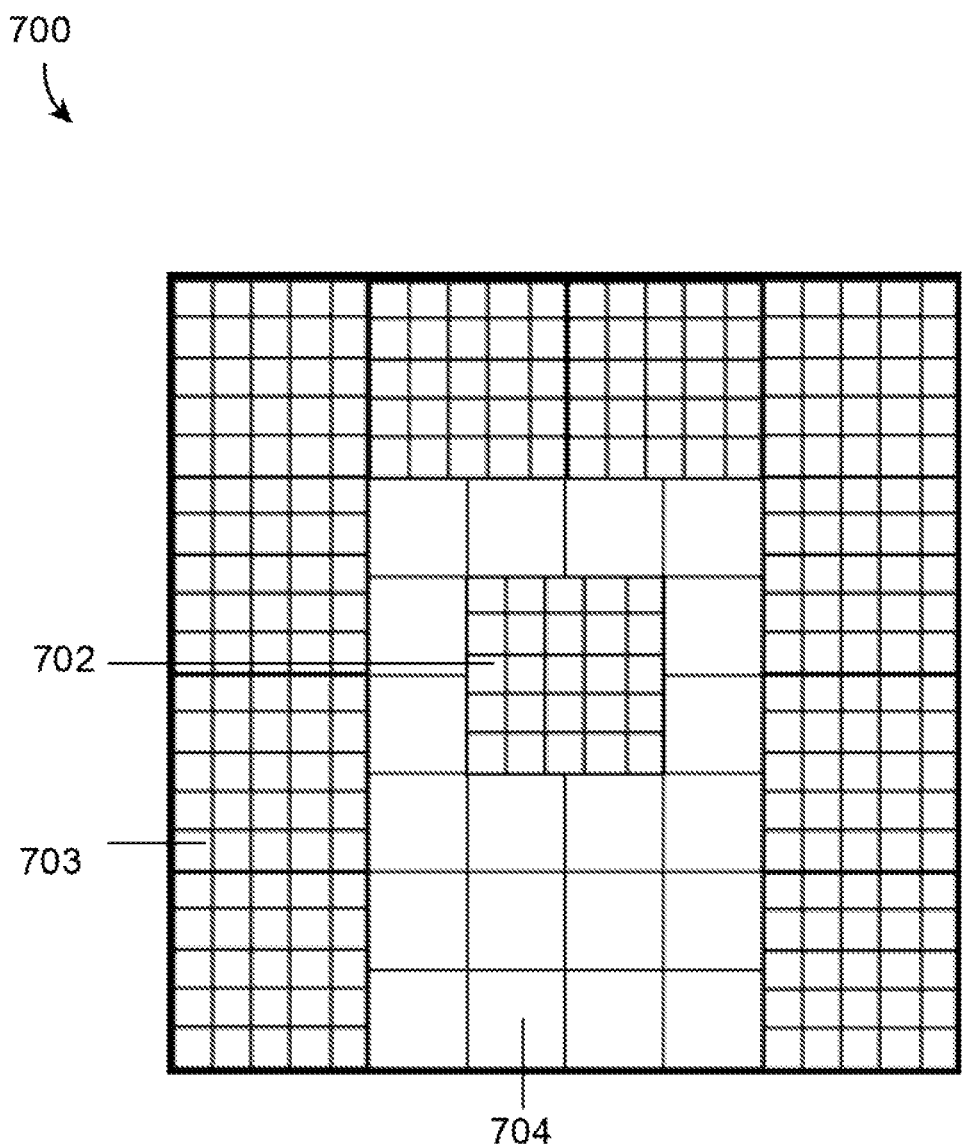

FIG. 7 illustrates a pixel arrangement 700 according to an embodiment of the present disclosure. The pixel arrangement 700 may be implemented with the environment 100 in some embodiments. In some embodiments, the pixel arrangement 700 may comprise a first region of pixels 702, a second region of pixels 703, and a third region of pixels 704. In some embodiments, the first region of pixels 702 and the second region of pixels 703 may have smaller pixels that are positioned more closely together compared to pixels of the third region of pixels 704. In some embodiments, a distance between adjacent pixels in the first region of pixels 702 and between adjacent pixels in the second region of pixels 703 may be smaller than a distance between adjacent pixels in the third region of pixels 704. In some embodiments, a size of each pixel and a distance between adjacent pixels may be equal in the first region of pixels 702 and the second region of pixels 703. Alternatively, a size of each pixel and a distance between adjacent pixels may be unequal in the first region of pixels 702 and the second region of pixels 703. For example, pixels in the first region of pixels 702 may be smaller and closer together than pixels in the second region of pixels 703. In some embodiments, pixels in the first region of pixels 702 may be equal in size and equally spaced apart. In some embodiments, pixels in the second region of pixels 703 may be equal in size and equally spaced apart. In some embodiments, pixels in the third region of pixels 704 may be equal in size and equally spaced apart. In some embodiments, the first region of pixels 702 may comprise one or more rectangular regions, or a rectangular arch. In some embodiments, the second region of pixels 703 may comprise one or more rectangular regions. In some embodiments, the third region of pixels 704 may comprise one or more rectangular regions. In some embodiments, the first region of pixels 702 may be disposed in an interior of the second region of pixels 703. In some embodiments, a size or area of the first region of pixels 702 may be smaller than a size of the second region of pixels 703. In some embodiments, the third region of pixels 704 may be at least partially disposed in between the first region of pixels 702 and the second region of pixels 703. In some embodiments, the first region of pixels 702 and the second region of pixels 703 may correspond to one or more regions of interest having higher resolution than other regions such as the third region of pixels 704.

Figure 8:
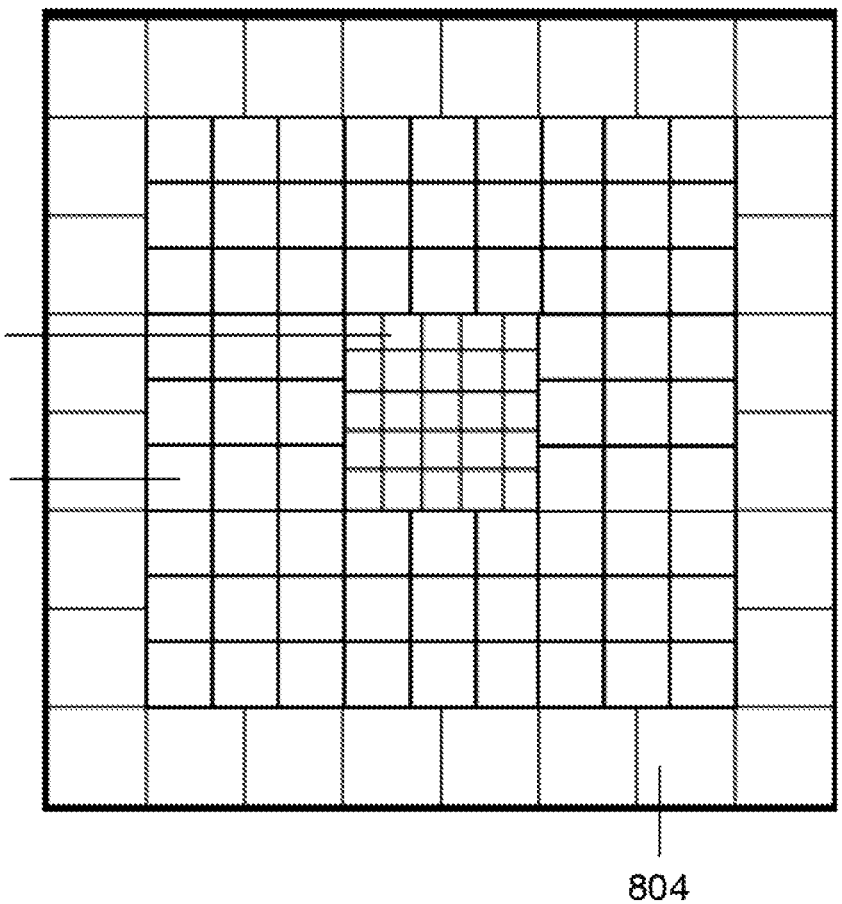

FIG. 8 illustrates a pixel arrangement 800 according to an embodiment of the present disclosure. The pixel arrangement 800 may be implemented with the environment 100 in some embodiments. In some embodiments, the pixel arrangement 800 may comprise a first region of pixels 802, a second region of pixels 803, and a third region of pixels 804. In some embodiments, the first region of pixels 802 and the second region of pixels 803 may have smaller pixels that are positioned more closely together compared to pixels of the third region of pixels 804. In some embodiments, a distance between adjacent pixels in the first region of pixels 802 and between adjacent pixels in the second region of pixels 803 may be smaller than a distance between adjacent pixels in the third region of pixels 804. In some embodiments, a size of each pixel and a distance between adjacent pixels may be unequal in the first region of pixels 802 and the second region of pixels 803. For example, pixels in the first region of pixels 802 may be smaller and closer together than pixels in the second region of pixels 803. In some embodiments, pixels in the first region of pixels 802 may be equal in size and equally spaced apart. In some embodiments, pixels in the second region of pixels 803 may be equal in size and equally spaced apart. In some embodiments, pixels in the third region of pixels 804 may be equal in size and equally spaced apart. In some embodiments, the first region of pixels 802 may comprise one or more rectangular regions. In some embodiments, the second region of pixels 803 may comprise one or more rectangular regions or rectangular shells. In some embodiments, the third region of pixels 804 may comprise one or more rectangular regions or shells. In some embodiments, the first region of pixels 802 may be disposed in an interior of the second region of pixels 803. In some embodiments, a size or area of the first region of pixels 802 may be smaller than a size of the second region of pixels 803. In some embodiments, the third region of pixels 804 may be disposed outside of the first region of pixels 802 and the second region of pixels 803. In some embodiments, the first region of pixels 802 and the second region of pixels 803 may correspond to one or more regions of interest having higher resolution than other regions such as the third region of pixels 804. In some embodiments, the first region of pixels 802 may correspond to a region of interest having a higher resolution than a region of interest corresponding to the second region of pixels 803. In some embodiments, a resolution may be based on a distance from a center of a field of view. The density of concentration of pixels may be based on a distance from a center of the pixel arrangement 800.

Figure 9:
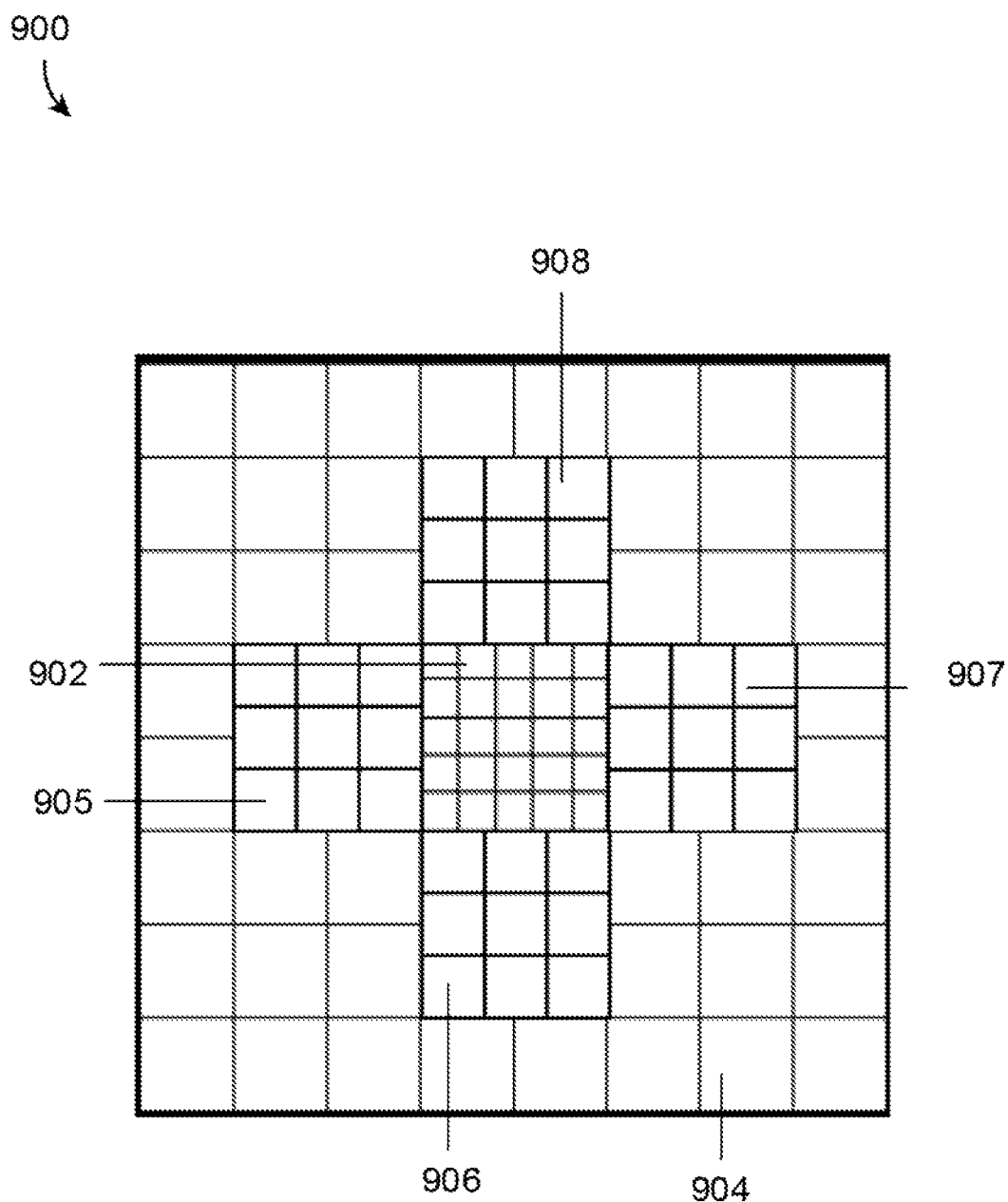

FIG. 9 illustrates a pixel arrangement 900 according to an embodiment of the present disclosure. The pixel arrangement 900 may be implemented with the environment 100 in some embodiments. In some embodiments, the pixel arrangement 900 may comprise a first region of pixels 902, a second region of pixels 904, a third region of pixels 905, a fourth region of pixels 906, and a fifth region of pixels 907. In some embodiments, the first region of pixels 902 may have smaller pixels that are positioned more closely together compared to pixels of the second region of pixels 904. In some embodiments, the first region of pixels 902 may have smaller pixels that are positioned more closely together compared to pixels of the third region of pixels 905, the fourth region of pixels 906, and the fifth region of pixels 907. In some embodiments, the third region of pixels 905, the fourth region of pixels 906, and the fifth region of pixels 907 may have smaller pixels that are positioned more closely together compared to pixels of the second region of pixels 904. In some embodiments, a size of each pixel and a distance between adjacent pixels may be unequal in the third region of pixels 905, the fourth region of pixels 906, and the fifth region of pixels 907. For example, pixels in the third region of pixels 905 may be smaller and closer together than pixels in the fourth region of pixels 906. In some embodiments, pixels in the first region of pixels 902 may be equal in size and equally spaced apart. In some embodiments, pixels in the second region of pixels 904 may be equal in size and equally spaced apart. In some embodiments, pixels in the third region of pixels 905, the fourth region of pixels 906, and the fifth region of pixels 907 may be equal in size and equally spaced apart. In some embodiments, the first region of pixels 902 may comprise one or more rectangular regions. In some embodiments, the second region of pixels 904 may comprise one or more rectangular regions. In some embodiments, the third region of pixels 905, the fourth region of pixels 906, and the fifth region of pixels 907 may comprise one or more rectangular regions or shells. In some embodiments, the first region of pixels 902 may be disposed in an interior of the second region of pixels 904. In some embodiments, a size or area of the first region of pixels 902 may be smaller than a size of the second region of pixels 904. In some embodiments, the third region of pixels 905, the fourth region of pixels 906, and the fifth region of pixels 907 may extend from the first region of pixels 902. In some embodiments, the first region of pixels 902 may correspond to one or more regions of interest having higher resolution than other regions such as the second region of pixels 904. In some embodiments, the first region of pixels 902 may correspond to a region of interest having a higher resolution than regions of interest corresponding to the third region of pixels 905, the fourth region of pixels 906, and the fifth region of pixels 907. In some embodiments, the third region of pixels 905, the fourth region of pixels 906, and the fifth region of pixels 907 may extend outward from the first region of pixels 902. In some embodiments, a resolution may be based on a distance from a center of a field of view. The density or concentration of pixels may be based on a distance from a center of the pixel arrangement 900.

Figure 10:
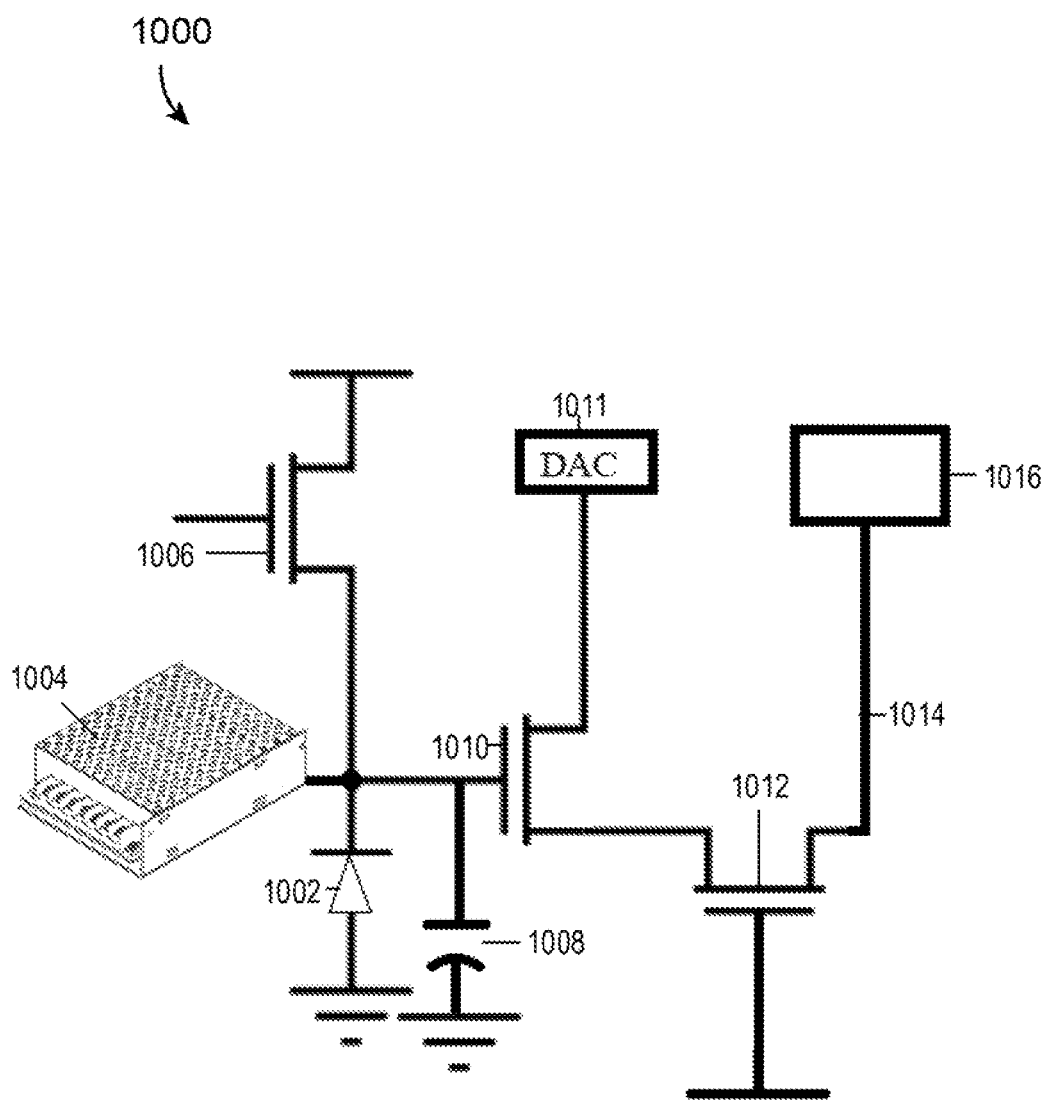
FIG. 10 illustrates an example diagram of a pixel according to an embodiment of the present disclosure.

FIG. 10 illustrates an example diagram of a pixel 1000 according to an embodiment of the present disclosure. The pixel arrangement 1000 may be implemented with the environment 100 in some embodiments. In FIG. 10, the pixel 1000 may comprise a detector 1002, a capacitor 1008, a buffer 1010, and logic comprising transistors 1006 and 1012. A power supply 1004 may be provided to the pixel 1000. The power supply 1004 may be a DC power supply, and may be, for example, 3.3 Volts. The detector 1002 may comprise a photodiode, and may be configured to detect light or electromagnetic radiation and convert the light or the electromagnetic radiation into an electric signal. The capacitor 1008 may comprise a floating diffusion capacitor. The electric signal from an output of the detector 1002 may charge the capacitor 1008 and produce a photovoltage which may be supplied as an input to the buffer 1010. The buffer 1010 may be a source follower which amplifies the electric signal. The transistor 1006 may comprise a switch to reset the pixel 1000. When the transistor 1006 turns on, the photovoltage becomes close to the voltage supplied by the power supply 1004. As the light or electromagnetic radiation is detected by the detector 1002, the photovoltage decreases. The buffer 1010 may accept a reference voltage from a DAC 1011 as an input. The buffer 1010 may comprise a comparator that compares when the photovoltage decreases to below the reference voltage and captures the photovoltage. The transistor 1012 may further amplify and output the photovoltage to a bus 1014 that connects to a processor 1016.

Figure 11A:
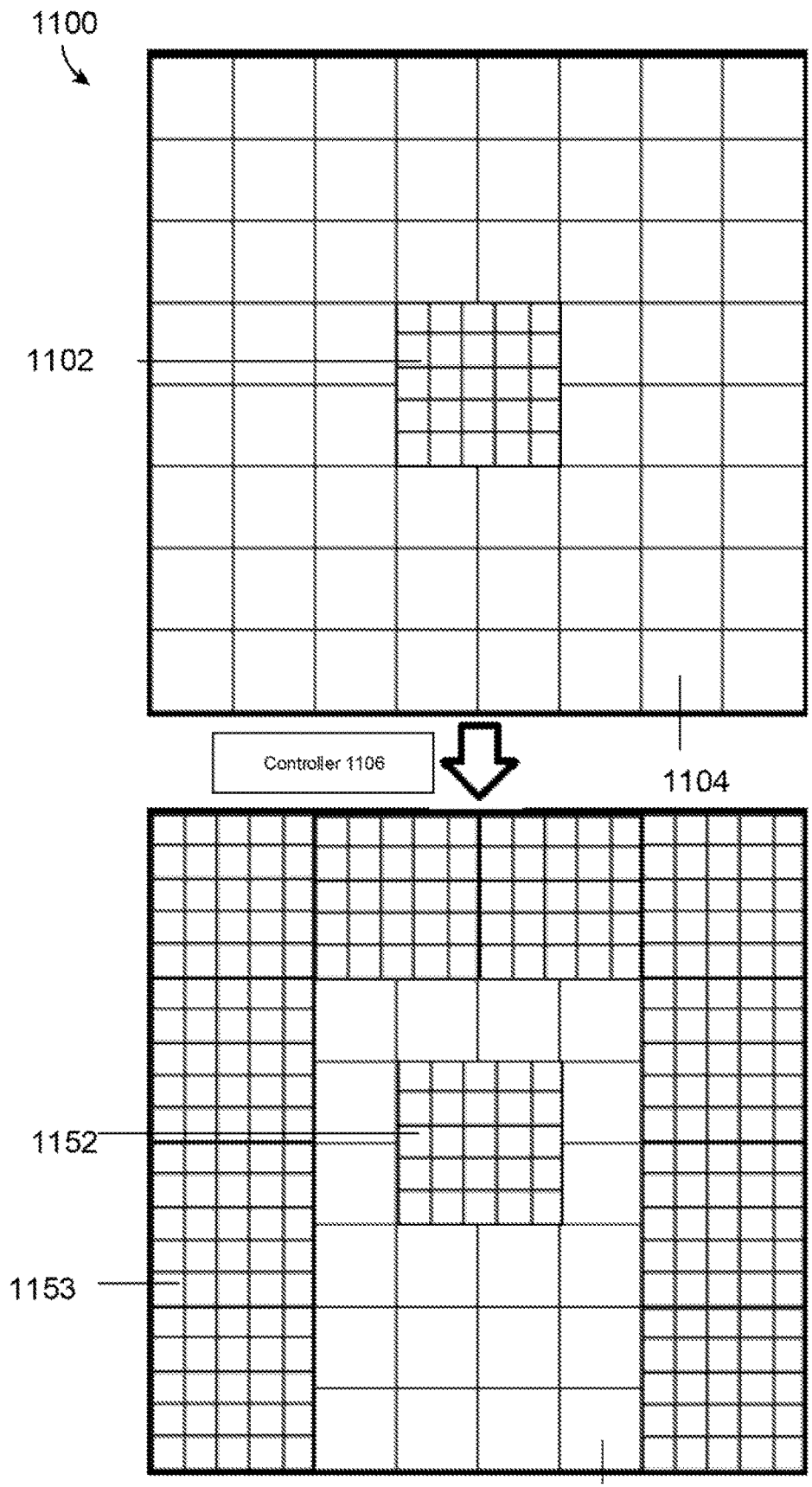
FIGS. 11A-11B illustrate a pixel arrangement according to an embodiment of the present disclosure and an operation of a sensor using the pixel arrangement.
Figure 11B:
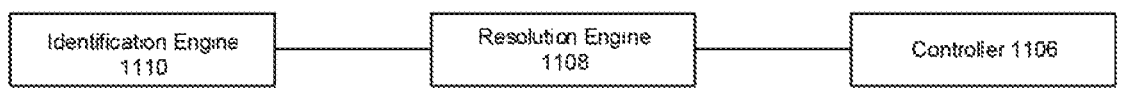

FIGS. 11A-11B illustrate a pixel arrangement 1100 according to an embodiment of the present disclosure and an operation of a sensor using the pixel arrangement. The pixel arrangement 1100 may be implemented with the environment 100 in some embodiments. In some embodiments, if the sensor comprises a LiDAR or a radar sensor, a controller 1106 of the sensor may dynamically change the pixel arrangement 1100 to replace and/or add additional regions of interest. As shown in FIG. 11B, the controller 1106 may change the pixel arrangement 1100 in response to feedback from a resolution engine 1108 and an identification engine 1110. The controller 1106, the resolution engine 1108 and the identification engine 1110 may comprise one or more processors or may be integrated into a single processor or multiple processors. In some embodiments, the identification engine 1110 may detect an object, feature, or region to be increased in resolution, for example, in response to detecting a type or movement of the object or feature. In some embodiments, the identification engine 1110 may determine relative priorities of objects or features. In some examples, the identification engine 1110 may determine an object such as a traffic light to be high priority to be increased in resolution, another object such as a moving vehicle to be medium priority to be increased in resolution, and another object such as a tree to be low priority. Using input from the identification engine, the resolution engine 1108 may determine whether an object or feature should be increased in resolution. In some examples, the resolution engine 1108 may detect a resolution of an object, feature, or region, and determine that the resolution is below a threshold. In response to the resolution being below a threshold, the resolution engine 1108 may provide feedback to the controller 1106 to change the pixel arrangement 1100 to replace and/or add additional regions of interest to increase a resolution of one or more objects or features in the region.

In FIG. 11A, the pixel arrangement 1100 may initially comprise a first region of pixels 1102, and a second region of pixels 1104. the first region of pixels 1102 may have smaller pixels that are positioned more closely together compared to pixels of the second region of pixels 1104. The controller 1106 of the sensor may dynamically change the pixel arrangement 1100 to further include a region of interest corresponding to a third region of pixels 1153, which may have smaller pixels that are positioned more closely together compared to pixels of second region of pixels 1154. The pixel arrangement 1100 may be changed or updated if objects in a corresponding region of interest are detected, for example, by the identification engine 1110. For example, if the identification engine 1110 detects a traffic sign or light at a specific position such as a top right corner of a field of view, the resolution engine 1108 may provide input to the controller 1106 to update a particular region of pixels by increasing a density of pixels corresponding to the region of interest at the top right corner. The sensor may capture increased resolution of data at the specific location. In some embodiments, the pixel arrangement 1100 may be changed or updated if the identification engine 1110 detects that objects or features in a field of view change, or if objects or features change or move at a rate faster than a threshold rate. For example, if the identification engine 1110 detects a natural disaster such as a fire or hurricane, and/or a rate of change of the fire or hurricane to be greater than a threshold rate, the resolution engine 1108 may provide input to the controller 1106 to update a particular region of pixels by increasing a density of pixels corresponding to a location of the natural disaster. As another example, the pixel arrangement 1100 may be changed or updated based on environmental conditions or a change in the environmental conditions. For example, if the identification engine 1110 detects a temperature in a specific location is higher than surroundings, or if a rate of change of a temperature in a specific location is greater than a threshold or higher than surroundings, which may indicate an emergency or urgent situation that warrants attention, the resolution engine 1108 may provide input to the controller 1106 to update a particular region of pixels by increasing a density of pixels corresponding to the specific location.

FIG. 12 illustrates a flowchart of a method to assembly sensors in a daisy chain communication network according to some embodiments. In this and other flowcharts, the flowchart 1200 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 12.

In step 1202, a sensor may acquire data of nonuniform resolution over a field of view of the sensor. In step 1204, a controller may determine a driving action of a vehicle based on the data. In step 1206, the controller may perform the driving action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
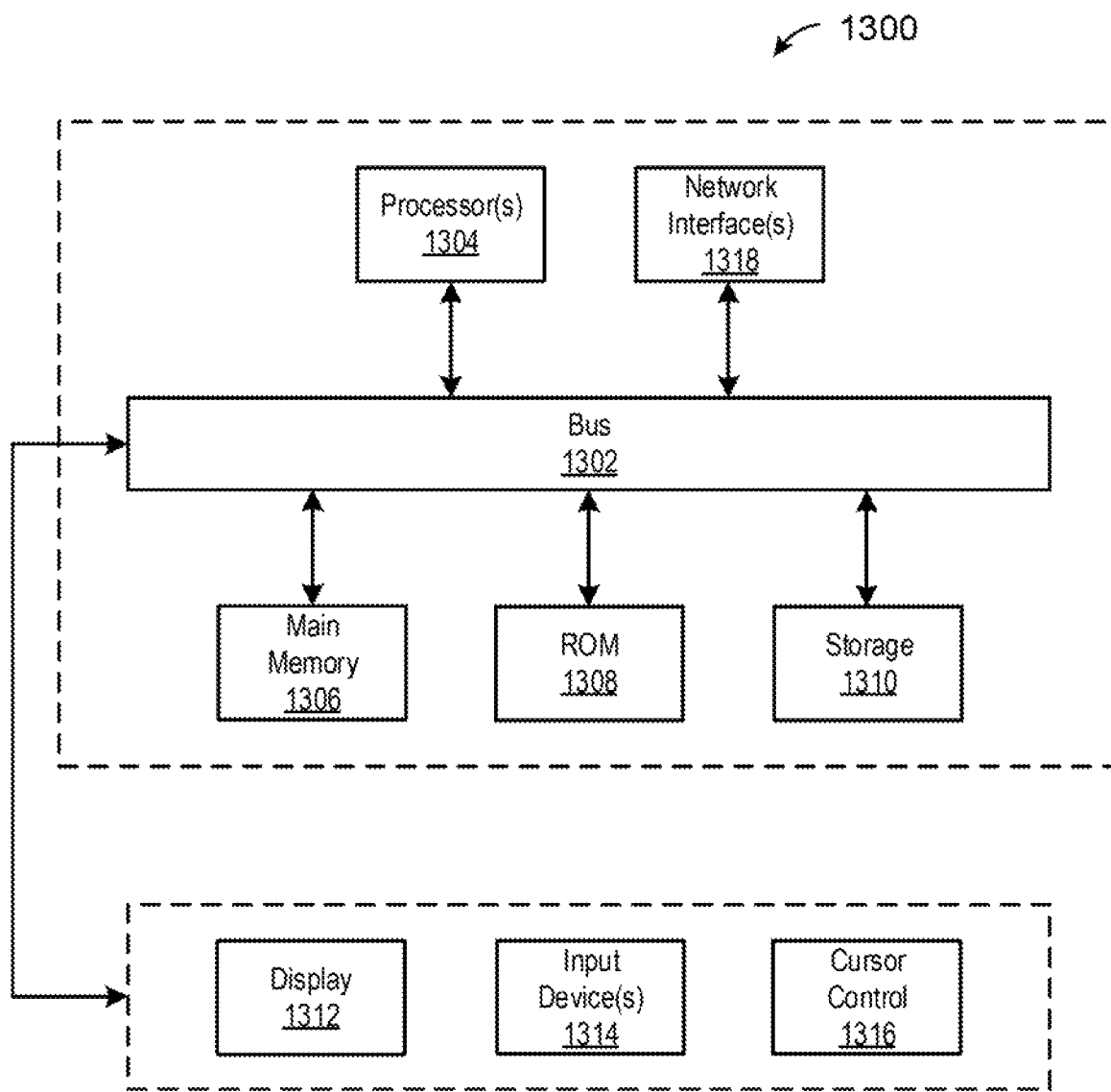
FIG. 13 is a diagram of an example computer system for implementing the features disclosed herein.

FIG. 13 is a block diagram that illustrates a computer system 1300 upon which any of the embodiments described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to output device(s) 1312, such as a cathode ray tube (CRT) or LCD display (or touch screen), for displaying information to a computer user. Input device(s) 1314, including alphanumeric and other keys, are coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

The computer system 1300 also includes a communication interface 1318 coupled to bus 1302. Communication interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicated with a WAN). Wireless links may also be implemented. In any such implementation, communication interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network(s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
    a sensor configured to acquire data of nonuniform resolution over a field of view of the sensor according to a pixel arrangement of the sensor, wherein the pixel arrangement of the sensor comprises:
        a first region comprising first pixels having a first size; and
        a second region comprising second pixels having a second size, wherein the first size is greater than the second size; and
    one or more processors configured to:
        detect a presence of a feature in a particular region of the acquired data; and
        capture the feature using at least a portion of the second pixels in the second region and capture data external to the feature using at least a portion of the first pixels to increase a resolution of the feature compared to surrounding features.

2. The system of claim 1, wherein the first region is disposed towards a periphery of the field of view compared to the second region.

3. The system of claim 1, wherein each of the first pixels and the second pixels comprises:
    a detector configured to detect light or electromagnetic radiation and convert the detected light or electromagnetic radiation into an electric signal;
    a buffer configured to isolate the electric signal from at least one other electric signal; and
    a logic element configured to process the electric signal into the data.

4. The system of claim 1, wherein each of the first pixels and the second pixels comprises:
    a photodiode;
    a capacitor that when charged, produces a photovoltage to be supplied to a buffer;
    the buffer which amplifies an electric signal; and
    a transistor that includes a switch to reset the pixel.

5. The system of claim 1, wherein the one or more processors are further configured to:
    dynamically change a first density of the first pixels or the spacing between the adjacent first pixels within the first region, or a second density of the second pixels or the spacing between the adjacent second pixels within the second region, in response to detecting a presence of a second feature corresponding to the first region or the second region.

6. The system of claim 1, wherein the one or more processors are further configured to:
    dynamically replace a first portion of the first region or a second portion of the second region with third pixels having a third density, wherein the third density is higher than the first density or the second density, in response to detecting a presence of a second feature corresponding to the first portion or the second portion.

7. The system of claim 1, wherein the one or more processors are further configured to:
    dynamically change a first density of the first pixels or the spacing between the adjacent first pixels within the first region, or a second density of the second pixels or the spacing between the adjacent second pixels within the second region, based on a change of the feature.

8. The system of claim 1, wherein the one or more processors are further configured to:
dynamically change a first density of the first pixels or the spacing between the adjacent first pixels within the first region, or a second density of the second pixels or the spacing between the adjacent second pixels within the second region, based on a rate of change of the feature.

9. The system of claim 1, wherein the one or more processors are further configured to:
detect a change in an environmental condition at a specific location, wherein the specific location corresponds to or is captured by the first pixels; and
dynamically change a first density of the first pixels or the spacing between the adjacent first pixels within the first region, in response to the change in the environmental condition.

10. The system of claim 9, wherein the environmental condition comprises a temperature.

11. The system of claim 1, wherein the one or more processors are further configured to:
detect a rate of change in an environmental condition at a specific location, wherein the specific location corresponds to or is captured by the first pixels; and
dynamically change a first density of the first pixels or the spacing between the adjacent first pixels within the first region, based on the rate of change in the environmental condition.

12. A method, comprising:
acquiring data of nonuniform resolution, by a sensor, over a field of view of the sensor according to a pixel arrangement of the sensor, wherein the pixel arrangement of the sensor comprises:
a first region comprising first pixels having a first size; and
a second region comprising second pixels having a second size, wherein the first size is greater than the second size; and
detecting, by one or more processors controlling an operation of the sensor, a presence of a feature in a particular region of the acquired data; and
capturing the feature using at least a portion of the second pixels in the second region and capture data external to the feature using at least a portion of the first pixels to increase a resolution of the feature compared to surrounding features.

13. The method of claim 12, wherein the first region is disposed towards a periphery of the field of view compared to the second region.

14. The method of claim 12, wherein the acquiring comprises:
detecting, by a detector, light or electromagnetic radiation;
converting, by the detector, the detected light or electromagnetic radiation into an electric signal;
isolating, by a buffer, the electric signal from at least one other electric signal; and
converting, by a logic, the electric signal to the data.

15. The method of claim 12, further comprising:
dynamically changing a first density of the first pixels or the spacing between the adjacent first pixels within the first region, or a second density of the second pixels or the spacing between the adjacent second pixels within the second region, in response to detecting a presence of a second feature corresponding to the first region or the second region.

16. The method of claim 12, further comprising:
dynamically replacing a first portion of the first region or a second portion of the second region with third pixels having a third density, wherein the third density is higher than the first density or the second density, in response to detecting a presence of a second feature corresponding to the first portion or the second portion.

17. The method of claim 12, further comprising:
dynamically changing a first density of the first pixels or the spacing between the adjacent first pixels within the first region, or a second density of the second pixels or the spacing between the adjacent second pixels within the second region, based on a change of the feature.

18. The method of claim 12, further comprising:
dynamically changing a first density of the first pixels or the spacing between the adjacent first pixels within the first region, or a second density of the second pixels or the spacing between the adjacent second pixels within the second region, based on a rate of change of the feature.

19. The method of claim 12, further comprising:
detecting a change in an environmental condition at a specific location, wherein the specific location corresponds to or is captured by the first pixels; and
dynamically changing a first density of the first pixels or the spacing between the adjacent first pixels within the first region, in response to the change in the environmental condition.

20. The method of claim 12, further comprising:
detecting a rate of change in an environmental condition at a specific location, wherein the specific location corresponds to or is captured by the first pixels; and
dynamically changing a first density of the first pixels or the spacing between the adjacent first pixels within the first region, based on the rate of change in the environmental condition.

* * * * *